United States Patent
Moscatelli et al.

(10) Patent No.: US 11,859,125 B2
(45) Date of Patent: Jan. 2, 2024

(54) METHOD FOR INHIBITING WATER PERMEATION IN AN EXTRACTION WELL OF A HYDROCARBON FLUID FROM AN UNDERGROUND RESERVOIR

(71) Applicant: ENI S.P.A., Rome (IT)

(72) Inventors: Davide Moscatelli, Arese (IT); Lucilla Del Gaudio, San Donato Milanese (IT); Paola Albonico, San Donato Milanese (IT); Alessandra Belloni, San Donato Milanese (IT); Alberto Cesana, Verano Brianza (IT)

(73) Assignee: ENI S.P.A., Rome (IT)

( * ) Notice: Subject to any disclaimer, the term of this patent is extended or adjusted under 35 U.S.C. 154(b) by 48 days.

(21) Appl. No.: 17/440,985

(22) PCT Filed: Mar. 19, 2020

(86) PCT No.: PCT/IB2020/052536
§ 371 (c)(1),
(2) Date: Sep. 20, 2021

(87) PCT Pub. No.: WO2020/194145
PCT Pub. Date: Oct. 1, 2020

(65) Prior Publication Data
US 2022/0169910 A1 Jun. 2, 2022

(30) Foreign Application Priority Data
Mar. 22, 2019 (IT) .................. 102019000004191

(51) Int. Cl.
*C09K 8/502* (2006.01)
*C09K 8/516* (2006.01)
*C09K 8/588* (2006.01)
*E21B 43/20* (2006.01)

(52) U.S. Cl.
CPC .............. *C09K 8/502* (2013.01); *C09K 8/516* (2013.01); *C09K 8/588* (2013.01); *E21B 43/20* (2013.01)

(58) Field of Classification Search
CPC ........ C09K 8/502; C09K 8/516; C09K 5/588; E21B 43/20
See application file for complete search history.

(56) References Cited

U.S. PATENT DOCUMENTS

| | | | | |
|---|---|---|---|---|
| 4,330,450 A | * | 5/1982 | Lipowski | C08J 3/09 210/732 |
| 4,464,508 A | | 8/1984 | Easterly, Jr. | |
| 5,465,792 A | * | 11/1995 | Dawson | C09K 8/512 166/295 |
| 6,169,058 B1 | * | 1/2001 | Le | C09K 8/62 507/224 |
| 10,793,768 B2 | * | 10/2020 | Patel | C09K 8/82 |
| 2008/0289828 A1 | * | 11/2008 | Hutchins | C09K 8/68 166/308.3 |
| 2009/0270280 A1 | | 10/2009 | Zhang et al. | |
| 2017/0183558 A1 | * | 6/2017 | Funkhouser | C09K 8/487 |

FOREIGN PATENT DOCUMENTS

| | | | |
|---|---|---|---|
| EP | 0 107 226 A2 | 5/1984 | |
| WO | WO-0196707 A1 * | 12/2001 | ............ C09K 8/512 |
| WO | WO-2016166672 A1 * | 10/2016 | ............ C08F 220/06 |
| WO | WO-2018222545 A1 * | 12/2018 | ............ A01N 25/00 |

OTHER PUBLICATIONS

Saenz, J.M. et al., "Dispersion Polymerization In Polar-Solvents", Journal of Polymer Science, Part A—Polymer Chemistry; vol. 33, (1995), pp. 1511-1521.
Zohuriaan-Mehr, Mohammad J. et al., "Superabsorbent Polymer Materials: A review", Iranian Polymer Journal; vol. 17(6) (2008), pp. 451-477.
International Search Report dated May 29, 2020 in PCT/IB2020/052536 filed on Mar. 19, 2020.

* cited by examiner

*Primary Examiner* — Angela M DiTrani Leff
(74) *Attorney, Agent, or Firm* — Oblon, McClelland, Maier & Neustadt, L.L.P.

(57) ABSTRACT

A method for inhibiting water permeation in an extraction well of a hydrocarbon fluid from an underground reservoir may include: supplying a water-in-oil emulsion including an oily continuous phase and an aqueous discontinuous phase containing a plurality of particles of at least one hydrogel containing a cationic polymer; and positioning the water-in-oil emulsion in contact with the underground reservoir. A treatment fluid for hydrocarbon fluid extraction wells may contain a water-in-oil emulsion including an oily continuous phase and an aqueous discontinuous phase containing a plurality of particles of at least one hydrogel containing a cationic polymer.

14 Claims, No Drawings

METHOD FOR INHIBITING WATER PERMEATION IN AN EXTRACTION WELL OF A HYDROCARBON FLUID FROM AN UNDERGROUND RESERVOIR

CROSS-REFERENCE TO RELATED APPLICATIONS

The present application is the national stage of international application PCT/IB2020/052536, filed on Mar. 19, 2020, and claims the benefit of the filing date of Italian Appl. No. 102019000004191, filed on Mar. 22, 2019.

The present invention relates to a method for inhibiting water permeation in an extraction well of a hydrocarbon fluid from an underground reservoir.

In particular, the present invention relates to a method for inhibiting water permeation in an extraction well of a hydrocarbon fluid from an underground reservoir which comprises the injection into the reservoir of a treatment fluid containing at least one chemical compound capable of swelling by selective absorption of the reservoir water (i.e. formation water) present in there, by modifying the local permeability of the reservoir and thus blocking the permeation of further water in the extraction well. The treatment fluid is formulated in the form of a dispersion of an aqueous phase into an oily continuous phase. This formulation causes the injected compound to interact mainly or even exclusively with the reservoir water and not with the irreducible water, thus not affecting the mobility of the hydrocarbon fluid.

For the purposes of the present description, the expression "hydrocarbon fluid" means a fluid containing hydrocarbons or mainly containing hydrocarbons, in the gaseous, liquid state or in the form of a gas-liquid mixture, of natural origin, present in an underground or underwater rock formation, such as a mineral oil or a natural gas. Mineral oil may optionally contain water in dispersed form. Hereinafter in the present description, the terms "mineral oil" and "oil" are used alternatively.

For the purposes of the present description, the expression "irreducible water" means the fraction of water present in the pores of a rock formation containing a hydrocarbon fluid or in the spaces between the rock grains that make up this formation; the irreducible water, retained in the formation mainly by the effect of surface tension forces, is not substantially removed during the extraction of the hydrocarbon fluid from the formation.

For the purposes of the present description, the expression "reservoir water" means the fraction of water present in a rock formation containing a hydrocarbon fluid, which can be removed from the formation in association with the extracted hydrocarbon fluid. The reservoir water (or "formation water" as alternative indication) can be formed, for example, by infiltration of water from an aquifer located near the reservoir or by injections of water or steam in the subsoil carried out to displace the fluid towards the extraction well.

The presence of water in association with a hydrocarbon fluid extracted from an underground reservoir is a problem of great economic impact in the field of oil extraction, and generally in the gas and oil industry.

The extraction of a hydrocarbon fluid in admixture with water reduces the efficiency of extraction of the fluid itself, increases the costs and dimensions of the equipment necessary for water separation, increases the overall costs of fluid extraction and, finally, poses the problem of the disposal of separated water, which is contaminated by hydrocarbons.

The extraction of water together with the hydrocarbon fluid from an oil well, in addition to leading to frequent interruptions of the extraction operations so as to allow the implementation of measures to contain water permeation, in some cases can be of such an extent that leads to the closure in advance of the well, thus preventing the complete exploitation of the oil field (for example, when the oil field is located near an aquifer).

Various techniques are known in the state of the art for reducing the extraction of water from an oil well. One of these techniques provides for the injection into the rock formation of the reservoir of chemical compounds, such as polymers, gels and foams, capable of forming a mechanical barrier impermeable to water, blocking the preferential paths of water in the rock formation towards the extraction well. The mechanical barrier can be obtained by reacting in situ, i.e. in the underground formation, two or more reagents, injected separately, which form a barrier compound impermeable to water.

The methods known in the state of the art for inhibiting water permeation in an extraction well of a hydrocarbon fluid from an underground reservoir have several drawbacks.

First, the water permeation-reducing effect is short-lived. This leads to frequent interruptions of the extraction activity to allow further injections of treatment fluid into the reservoir with a consequent reduction in production capacity.

Secondly, the compounds injected according to the methods of the prior art have a poor selectivity towards the reservoir water. These compounds, in fact, can also interact with irreducible water or even with water dispersed or emulsified in oil, also causing a reduction in the mobility of the hydrocarbon fluid and, therefore, in its extraction yield.

To overcome the aforementioned drawbacks, in the application WO 2016/166672 the Applicant has described a treatment fluid containing particles of hydrogels with micrometric or nanometric sizes. This treatment fluid comprises a dispersion or emulsion in an organic solvent of a copolymer formed by at least one (meth)acrylic monomer and at least one comonomer comprising at least one ethylenic unsaturation and at least one polyoxyethylene chain. This treatment fluid is very effective in containing the inhibition of water permeation in the extraction wells of hydrocarbon fluids, thanks to the high selectivity of the microgels and nanogels towards water.

Despite the excellent performances shown, the effectiveness of the hydrogels described in WO 2016/166672 is influenced by the saline content of water present in the reservoir. In fact, it has been observed that the above hydrogels show a high swelling capacity, i.e. swelling by water absorption, when water salinity is within the range 10-80 g/l. In waters with higher saline content (salinity>80 g/l) the hydrogels tend to absorb little water or to expel the water already absorbed.

A further drawback of the hydrogel-based treatment fluids known in the art is represented by the not always effective adhesion of the hydrogel particles to the surface of the reservoir rock. In fact, in some cases, especially in those contexts where reservoir fluids are produced at high pressure, it is possible that the operations for producing hydrocarbon fluid, carried out after the treatment of the well with the treatment fluids based on the aforementioned hydrogels, also entail the extraction of the same hydrogels. It is therefore desirable to have treatment fluids capable of ensuring a more lasting and tenacious placement of the polymeric material of the hydrogel in the treated formation.

In view of the above state of the art, the Applicant has set itself the main objective of overcoming, at least in part, the drawbacks highlighted above of the methods known in the state of the art.

Within this aim, an object of the present invention is to provide a method for inhibiting water permeation in an extraction well of a hydrocarbon fluid, which allows to effectively reduce the amount of water extracted together with the hydrocarbon fluid, thus attenuating the drawbacks connected with the activities for separating water from hydrocarbon fluid and disposing of the water contaminated by hydrocarbons.

A second object of the present invention is to provide a method for inhibiting water permeation in an extraction well of a hydrocarbon fluid which can be effectively used in reservoirs characterized by rock formations having different geological characteristics (e.g. porosity, presence of fractures, etc.).

A further object of the present invention is to provide a method for inhibiting water permeation in an extraction well of a hydrocarbon fluid, which can be applied in the presence of reservoir water having salinity within a wide range of values, the method being able to be applied effectively, in particular, even in the presence of freshwater or water with a high saline content.

The Applicant has now found that these and other objects, which will be better illustrated in the following description, can be achieved by using a treatment fluid comprising a micrometric or nanometric dispersion of an aqueous phase in oil, where the aqueous discontinuous phase comprises particles of a hydrogel comprising chains of a cationic polymer, obtained for example starting from monomers containing at least one cationic group (e.g. a primary, secondary, tertiary or quaternary ammonium group).

In fact, it has been observed that the presence of cationic groups on the polymer leads to the formation of hydrogels based on cationic polymers with high swelling capacity with respect to water. Advantageously, the water absorption and retention properties of these hydrogels are little affected by the degree of water salinity, in particular when the salinity is due to the presence of divalent cations (e.g. $Ca^{2+}$, $Mg^{2+}$), which affect more heavily the performance of the hydrogels of the prior art.

Surprisingly, moreover, the hydrogels containing cationic polymers bind more strongly to the carbonatic rocks, probably due to the electrostatic interactions that are established between the positive charges of the polymer and the negative charges present on the surface of the carbonatic rocks. Once positioned inside the reservoir, the materials according to the present invention therefore modify the permeability of the rock formation in a more stable and lasting way than the hydrogels of the prior art.

The hydrogels described herein, in addition to having a high water absorption capacity, are stable at temperature and salinity conditions of water typical of an oil or natural gas reservoir (e.g. temperature within the range 50-90° C.)

In particular, the hydrogels that are swollen of water can resist prolonged contact with water with a high saline content, without undergoing significant structural degradation.

According to a first aspect, the present invention therefore concerns a method for inhibiting water permeation in an extraction well of a hydrocarbon fluid from an underground reservoir which comprises:
supplying a water-in-oil emulsion comprising:
an oily continuous phase,
an aqueous discontinuous phase comprising water and a plurality of particles of at least one hydrogel comprising at least one cationic polymer, wherein said cationic polymer does not contain any anionic units/groups;
positioning said water-in-oil emulsion in contact with said underground reservoir.

According to a second aspect, the present invention concerns a treatment fluid for extraction wells of hydrocarbon fluids comprising a water-in-oil emulsion comprising:
an oily continuous phase,
an aqueous discontinuous phase comprising a plurality of particles of at least one hydrogel comprising at least one cationic polymer wherein said cationic polymer does not contain any anionic units/groups.

Said treatment fluid is effective in the present method which allows to reduce the water-cut in the water shut-off operations in an extraction well of a hydrocarbon fluid from an underground reservoir.

According to a further aspect, the present invention concerns a process for preparing a water-in-oil emulsion comprising:
an oily continuous phase,
an aqueous discontinuous phase comprising a plurality of particles of at least one hydrogel comprising at least one cationic polymer,
said process comprising the following sequential steps:
supplying an oily continuous phase comprising at least one oily fluid;
supplying an aqueous discontinuous phase comprising water, at least one monomer having at least one cationic group and, optionally, at least one comonomer;
emulsifying said aqueous discontinuous phase in said oily continuous phase in the presence of at least one surfactant and at least one radical polymerization initiator forming free radicals to polymerize said monomer having at least one cationic group and optionally said co-monomer.

For the purposes of the present description and of the claims, the verb "to comprise" and all the terms deriving therefrom, as used herein in the description and in the claims, also include the meaning of the verb "to consist of" and the terms deriving therefrom.

The numerical limits and intervals expressed in the present description and appended claims also include the numerical value or numerical values mentioned. Furthermore, all the values and sub-intervals of a limit or numerical interval must be considered to be specifically included as though they had been explicitly mentioned.

For the purposes of the present description, the term "water-in-oil emulsion" (also called "inverse emulsion") means a dispersion comprising at least two immiscible phases. These immiscible phases include an oily continuous phase (also called "external phase") and an aqueous discontinuous phase (also called "internal phase"). The aqueous discontinuous phase is dispersed in the continuous phase in the form of droplets, in case the phase is mainly liquid, as in the course of the preparation of the treatment fluid, or in the form of particles, in case the aqueous phase is mainly gelled, as in the case of the treatment fluid obtained after polymerization. The term "droplet" or "particle" is used in the present description with reference to discrete portions of the discontinuous phase in the continuous phase, without any implication with respect to shape, sizes or other characteristics of the particles. Said droplets or particles, according to the present invention, are also defined as micrometric or nanometric with reference to their sizes lower than 1 mm and greater than 1 μm or greater than 10 nm and up to 1 μm, respectively.

For the purposes of the present description, a "particle (or droplet) of a hydrogel" is a particle or droplet which comprises a three-dimensional structure (network) of hydrophilic polymeric chains which are substantially insoluble in water; said three-dimensional structure can be a colloidal hydrogel in which water is the dispersing medium. In the treatment fluid according to the present invention said droplets or discrete hydrogel particles which make up the emulsion defined herein as water-in-oil, preferably comprise a minimum amount by weight of water, more preferably less than or equal to the amount by weight of cationic polymer. In this way it is possible to produce a hydrogel with a high concentration of polymer which produces a high swelling once placed in the desired position in the reservoir.

The method according to the present invention allows increasing the extraction efficiency of a hydrocarbon fluid, such as a mineral oil or a natural gas, preferably a mineral oil, from an underground reservoir.

The method according to the present invention can advantageously be used to improve the extraction efficiency of both a liquid fluid, such as a hydrocarbon oil, and a gaseous fluid, such as natural gas.

The method according to the present invention is based on the positioning within the reservoir of at least one water-in-oil emulsion containing a plurality of particles of a hydrogel comprising at least one cationic polymer which is able to selectively interact with the reservoir water, absorbing it in its three-dimensional structure. The swelling of the hydrogel following the absorption of the water prevents, or at least slows down, its permeation of the hydrocarbon fluid towards the extraction well.

The method of the invention can be applied to rock formations having different geological characteristics. In particular, the method is suitable for reducing water permeation in predominantly fractured rock formations or predominantly porous rock formations.

Furthermore, the method of the invention is effective even with waters with relatively high salinity, up to 150 g/l.

The inverse water-in-oil emulsion according to the present invention comprises at least one oily continuous phase in which an aqueous discontinuous phase containing the aforementioned cationic polymers is dispersed.

The water-in-oil emulsion according to the present invention does not provide the use of any self-inverting agent such as sulfosuccinate surfactant.

The oily continuous phase can comprise any oily fluid suitable for the purpose. The oily continuous phase has the function of conveying the hydrogel particles in the rock formation up to bringing them in contact with the reservoir water, crossing the hydrocarbon oil that may be present.

The oily fluid usable for the purposes of the present invention is substantially insoluble in water and soluble or partially soluble in oil. The term "substantially insoluble in water" means that the oily fluid has a solubility in water at 25° C. lower than or equal to 5 g/L, preferably lower than or equal to 1 g/L.

The term "partially soluble in oil" means that the oily fluid has a solubility in oil at 25° C. equal to or greater than 100 g/L.

Preferably, the oily fluid is in the liquid state within the temperature range of use in the extraction wells, particularly within the range of −5° C. to 90° C. The oily fluid can be polar or, preferably, non-polar.

Preferred examples of oily fluids usable for the purposes of the present invention are: hydrocarbon solvents $C_6$-$C_{25}$, more preferably $C_{10}$-$C_{15}$, aliphatic or aromatic e.g. kerosene); amides with a total number of carbon atoms from 7 to 25; alcohols with a total number of carbon atoms from 7 to 25; ethers with a total number of carbon atoms from 7 to 25 (e.g. diesyl ether, dioctyl ether, diphenyl ether); esters with a total number of carbon atoms from 7 to 25; ketones with a total number of carbon atoms from 7 to 25.

Hydrocarbon oily fluids are particularly preferred, such as for example oily fluids on the market under the name LAMIX 30® (mixture of $C_{11}$-$C_{14}$ hydrocarbons containing n-alkanes, isoalkanes, cyclic hydrocarbons (content of aromatic hydrocarbons lower than 2% by weight of the mixture)) and Versalis E-solv G® (mixture of aliphatic and aromatic hydrocarbons).

Other examples of oily fluids suitable for the purpose of the present invention are: naphtha, kerosenic cuts, diesel and biodiesel cuts, aromatic solvents such as xylene, toluene and tetraline.

The oily continuous phase may comprise a mixture of two or more oily fluids.

The choice of the oily fluid can depend on several factors, for example on the polarity of the hydrocarbon fluid to be extracted, on the environmental compatibility of the oily fluid and other factors. The person skilled in the art, also with the help of the present description, can choose an oily fluid suitable for the specific application of the present invention.

In one embodiment, the oily fluid can be present in the water-in-oil emulsion in an amount within the range 50%-99% by weight of the water-in-oil emulsion.

In one embodiment, the oily continuous phase may be present in a weight ratio with respect to the aqueous discontinuous phase within the range from 50:50 to 95:5.

The aqueous discontinuous phase comprises a plurality of particles of at least one hydrogel comprising water and at least one cationic polymer.

Preferably, the cationic polymer comprises at least one monomeric unit corresponding to a water-soluble monomer having at least one polymerizable ethylene unsaturation and at least one cationic group, preferably an ammonium group. Preferably, the aforementioned ammonium group is a —$N^+$—$R^1R^2R^3$ group, wherein $R^1$, $R^2$ and $R^3$, the same or different, are H or a $C_1$-$C_4$ alkyl group.

The terms "monomer" and "monomeric unit" corresponding to said monomer, as used herein in the description and in the claims, refer to the polymerizable compounds, and to the corresponding structural units derived therefrom after polymerization, which bind to each other giving rise to the formation of a polymer (or of a copolymer if formed from monomers, or composed of monomeric units, different from each other). In the polymerization of ethylenically unsaturated monomers with the polyaddition mechanism, the monomer and the corresponding monomeric unit have the same raw formula.

The cationic monomers usable for the formation of polymeric hydrogels according to the present invention are preferably selected from water-soluble salts of [2-(methacryloyloxy)ethyl] trimethylammonium, 2-(acryloyloxy) ethyl trimethyl ammonium and mixtures thereof. Preferred water-soluble salts are halides, more preferably chlorides or bromides.

The cationic polymers can be cationic homopolymers or cationic copolymers. In a preferred embodiment, the cationic polymers are cationic copolymers obtained starting from one or more cationic monomers and one or more (hydrophilic comonomers) without cationic groups. The use of hydrophilic comonomers without cationic groups allows modulating the hydrophilic properties of the cationic polymer, and therefore of the hydrogel, without introducing an excessive number of positive charges on the polymeric chain, which can make the emulsion unstable.

In one embodiment, the hydrophilic comonomer comprises at least one ethylenic unsaturation and at least one polyoxyethylene chain.

For example, the hydrophilic comonomer can be the compound having the formula (I) below

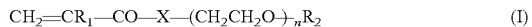  (I)

where:
$R_1$ is H or $CH_3$;
$R_2$ is selected from: H, $C_1$-$C_4$ alkyl, or a $COCR_3$=$CH_2$ acrylate group wherein $R_3$ is H or $CH_3$;
X is O or NH;
n is an integer within the range 0-500, preferably within the range 0-200, even more preferably within the range 4-100.

In a preferred embodiment, in the above formula (I) X is an oxygen atom, the comonomer being thus acrylic or methacrylic acid or a (poly)oxyethyl ester of said acids.

In another preferred embodiment, in the above formula (I) X is an NH group, the comonomer thus being an acrylamide monomer.

In a particularly preferred embodiment, the comonomer of formula (I) has only one ethylenic unsaturation, that is in the comonomer of formula (I) $R_1$ is $CH_3$, $R_2$ is selected from H and $C_1$-$C_4$ alkyl, X is O or NH and "n" is an integer within the range 4-50.

In another preferred embodiment, the comonomer of formula (I) is a difunctional monomer comprising at least two ethylenic unsaturations.

Preferably, the comonomer of formula (I) has a molecular weight within the range 200 Da-10000 Da, more preferably within the range 200 Da-5000 Da, even more preferably within the range 200 Da-3000 Da.

In a particularly preferred embodiment, the hydrophilic comonomer is selected from: poly(ethylene glycol)methyl ether acrylate, poly(ethylene glycol)methyl ether methacrylate, acrylamide, methacrylamide and mixtures thereof.

Poly(ethylene glycol)methyl ether acrylate or poly(ethylene glycol)methyl ether methacrylate preferably have a molecular weight within the range 200-10000 Da, preferably within the range 200-5000 Da, more preferably within the range 200-3000 Da.

In the present description, the molecular weights of the polymers are expressed as the average value by weight (Mw), as can be determined, for example, by gel permeation chromatography (GPC).

Preferably, the ratio between the total weight of the hydrophilic comonomers and the sum of the weight of the cationic monomers and optional comonomers is within the range 1%-50%, preferably within the range 3%-40%, even more preferably within the range 5%-35%.

For the purposes of the present description and appended claims, unless otherwise indicated, the total weight of the cationic monomers and optional comonomers does not include the weight of any cross-linking agents.

The hydrogel particles can have an average diameter within a wide range of values. For example, in one embodiment the hydrogel particles can have an average diameter within the range 1-1000 micrometers preferably within the range 5-500 micrometers, more preferably within the range 10-200 micrometers. For the purposes of the present description, hydrogels having particles of these sizes are also called "microgels".

The sizes of the microgels is comparable with the sizes of the fractures in fractured rock formations. The microgels according to the present invention can therefore be advantageously used to inhibit water permeation in an extraction well located in a fractured rock formation.

In another embodiment, the hydrogel particles can have an average diameter within the range of 10-500 nanometers more preferably within the range of 50-300 nanometers. For the purposes of the present description, hydrogels having particles of these sizes are also called "nanogels". The nanogels according to the present invention can therefore be advantageously used to inhibit water permeation in an extraction well located in porous rock formations, where the pores of the formation have on average sizes of the order of nanometers.

The average particle diameter of the aforementioned microgels and nanogels can be determined by means of dynamic light scattering (DLS) measurements or, in the case of microgels, also by means of a compound microscope.

The water-in-oil emulsions according to the present invention can be prepared with the methods and devices known in the art. In particular, the microgels can be prepared by inverse suspension polymerization or inverse miniemulsion polymerization.

In one embodiment, inverse suspension polymerization can be accomplished by emulsifying an aqueous discontinuous phase comprising water and at least one cationic monomer in an oily continuous phase comprising at least one oily fluid, in the presence of at least one surfactant and at least one radical polymerization initiator.

In the presence of the polymerization initiator and of the surfactant, the monomer and comonomer react and form copolymer particles which remain enclosed within the droplets which form the discontinuous phase of the emulsion.

The radical polymerization initiator is preferably a water soluble or dispersible compound. Classes of initiators that can be used for the purposes of the present invention are, for example: molecules of halogen atoms, hydroperoxides, azo-compounds and persulphates.

In order to obtain an inverse emulsion in which the hydrogel polymer particles have an average size of the order of 1-1000 micrometers (microgels), it is preferable to use thermally activatable radical polymerization initiators, i.e. compounds which, following an increase in temperature, decompose forming free radicals capable of initiating the polymerization reaction of the monomers and comonomers, if any.

The polymerization reaction initiated by thermally activatable initiators is preferably carried out at a temperature within the range of 30° C. to 120° C. according to the type of initiator used, preferably at a temperature lower than or equal to 90° C. so as to avoid degradation of the polymeric chains.

In order to obtain an inverse emulsion in which the hydrogel polymer particles have an average size within the range of 10 to 500 nanometers (nanogels), it is preferable to use redox polymerization initiators. The redox initiators comprise two compounds capable of reacting between them through an oxide-reduction reaction, generating the radicals necessary to initiate the polymerization reaction. An example of a redox pair usable as a polymerization initiator is the pair of persulfate/metabisulfite ions.

The polymerization reaction initiated by a redox pair preferably takes place at a temperature within the range 0-50° C., more preferably 0-30° C.

In general, the total concentration of the polymerization initiator is within the range 0.1%-10% by weight with respect to the weight of the monomers that take part in the polymerization.

In the case of microgels, the initiator is preferably added to the aqueous phase at a concentration within the range of 0.1%-2.5% by weight with respect to the weight of the monomers that take part in the polymerization.

In the case of nanogels, preferably each of the two initiators of the redox pair is added to the respective oily continuous phase and aqueous discontinuous phase at a concentration within the range 1.0%-3.0% by weight of the initiator referred to the weight of the phase to which is added.

The inverse suspension or inverse miniemulsion polymerization is carried out in the presence of at least one emulsifying agent to stabilize the emulsion. The emulsifying agent can be included in the continuous phase, in the discontinuous phase or in both phases.

Preferably, the emulsifying agent is a surfactant.

Preferably the emulsifying agent is added at least to the oily continuous phase.

In order to regulate the stability of the emulsion by adding surfactants, two or more surfactants having different values of HLB (Hydrophilic-Lipophilic Balance) can advantageously be used. By varying the weight ratio of the surfactants in the formulation, the desired HLB value can be obtained. Preferably, the HLB value of an inverse emulsion containing surfactants is within the range 3-15. In the case of the preparation of the microgels, the HLB value is preferably within the range 3-9. In the case of the preparation of the nanogels, the HLB value is preferably within the range 5-10.

The surfactants used are preferably non-ionic surfactants, since the absence of electric charges in this type of surfactants prevents their interaction with the cationic groups of the polymer, promoting the stability of the emulsion.

Preferred examples of non-ionic surfactants usable for the purpose of the present invention are: polysorbate (hydrophilic surfactant, HLB 15, e.g. TWEEN80®) and sorbitan monooleate (HLB 4.3, e.g. SPAN80®).

The emulsifying agents are present in the inverse emulsion preferably in a total concentration within the range 1.0%-30% by weight with respect to the weight of the inverse emulsion, preferably within the range 2.5%-20% by weight.

To obtain hydrogels in a cross-linked form, the inverse emulsion can also contain at least one cross-linking agent, which is preferably added to the aqueous discontinuous phase. The cross-linking agents known in the art suitable for cross-linking the cationic monomers and comonomers used for the purposes of the present invention can be used without particular limitations. Generally, cross-linking agents are compounds having two or more ethylenic unsaturations.

Preferred cross-linking agents are: N,N'-methylene-bis-acrylamide, ethylene glycol-dimethacrylate, divinylbenzene, poly(ethylene glycol)diacrylate, 1-4-butanediol diacrylate, trimethyl propane triacrylate, 1-4-bis(4-vinyl phenoxy)butane, bis(2-methacryloyl)oxyethyl disulfide.

The cross-linking degree of the copolymer can be varied by regulating the concentration of cross-linking agent in the formulation.

Preferably, the ratio between the total weight of the cross-linking agent and the total weight of the cationic monomers is within the range 0.1%-5%, preferably within the range 0.2%-1.0%.

The emulsification phase of the discontinuous phase and of the continuous phase can be carried out using the homogenizing devices known in the state of the art, such as mechanical stirrers (e.g. static mixer), sonicators (e.g. ultrasonic sonicator) or by mechanical stirring at high pressure.

In the case of microgels, preferably the emulsification phase is carried out by mechanical stirring (inverse suspension polymerization).

In the case of nanogels, the emulsification phase is preferably carried out with the aid of ultrasound (inverse miniemulsion polymerization).

Further additives can be present in the inverse water-in-oil emulsions according to the present invention, provided that they do not negatively interfere with the stability or other properties of the emulsions themselves. Examples of such additives are: wetting agents, thickening agents, weighting materials, stabilizers, bactericides, corrosion inhibitors, oxidants and the like.

Further information about the methods of inverse suspension or miniemulsion polymerization can be found for example in:

*Dispersion polymerization in polar-solvents*, SAENZ, J. M.; ASUA, J. M. (JOURNAL OF POLYMER SCIENCE, PART A-POLYMER CHEMISTRY; vol. 33(1995), p. 1511-1521;

*Superabsorbent polymer materials: A review*. Zohuriaan-Mehr, Mohammad J.; Kabiri, Kourosh; IRANIAN POLYMER JOURNAL; vol. 17(6) (2008), p. 451-477.

As said, the inverse emulsion which includes the hydrogels according to the present invention can be used as a treatment fluid to modify water permeability in a reservoir where the rock formation is mainly of a porous or fractured type.

Without wanting to refer to any particular theory, in the case of nanogels it is assumed that a possible mechanism of action is as follows.

The particles of nanogels containing the cationic polymer, having sizes compatible with the pore sizes of the rock formation, are carried up inside the aforementioned pores. The discontinuous phase particles containing the cationic polymer, thanks to the substantial miscibility of the oily fluid with the hydrocarbon oil, can migrate through the latter, if present in the rock formation, until it comes into contact with the reservoir water, without undergoing substantial alterations.

The contact of the treatment fluid with water causes the inversion or the collapse of the inverse emulsion or of the dispersion and therefore the release of the particles of nanogels or microgels, which consequently begin to absorb water and swell. The swelling causes a considerable increase in their volume (up to 10 times the initial volume) bringing about compression and immobilization in the pores and fractures of the rock formation and blocking or considerably slowing down the flow of the aqueous phase and the possible rise towards the extraction well. This creates an effective barrier to the passage of water.

The Applicant has also surprisingly found that the hydrogels of the present invention, characterized by a cationic polarity, are capable, in the swollen form, of binding more firmly to the surface of the rock with which they come into contact, thus constituting a barrier that is more resistant to pressure thrusts and therefore more stable with respect to the stresses to which the formation is subjected during the reservoir production operations.

Since for the emulsion inversion to be obtained the discontinuous phase droplets are required to come into contact with a relatively high amount of water, the contact of the droplets with the irreducible water (present at the contact interface with the oil in the discontinuous form and in a much less amount than the reservoir water) or with any water dispersed or emulsified in the oil, does not cause the release of the nanogel. The water-in-oil emulsion containing the nanogels therefore acts selectively towards the reservoir water, being active only in the points of the rock formation where the water/oil ratio is sufficiently high.

In the case of inverse emulsions containing microgels, the mechanism of action in the underground reservoir could be as follows.

The particles of microgels, due to their larger sizes than nanogels, have a certain tendency to settle, after a certain period of time, if they are not kept under stirring in the emulsion. Once positioned in the underground reservoir, the particles of microgels, having sizes compatible with the sizes of the fractures of the rock formation, settle through the continuous phase until they penetrate the aforementioned fractures, crossing any present oil, until they reach the interface between this and the water.

During settlement through oil, the hydrogel particles remain substantially unchanged, not interacting, in the times required for settlement, with the possible irreducible water, nor with the water possibly present in the oil in dispersed or emulsified form. Once they have come into contact with the reservoir water, the hydrogel particles exert their absorbent action towards the bulk water with which it comes into contact.

Even in the case of emulsions containing microgels, therefore, the release of the cationic polymer occurs selectively only in the points of the reservoir where reservoir water is present. It is believed that this is made possible by the fact that the water dispersed or emulsified in oil is not present in a sufficient amount to activate the process for breaking the emulsion, i.e. for penetrating the micelles inside which the microgels are enclosed.

In consideration of what has been described, the person skilled in the art can appreciate the advantages that derive from the use of the inverse emulsions according to the present invention.

In general, the inverse emulsions of the present description can be used as treatment fluids in the drilling, completion and maintenance phases of the extraction wells.

In particular, the aforementioned emulsions can be used to inhibit water permeation in an extraction well according to the present description, both before starting the extraction operations of the hydrocarbon fluid and when the well is already in production, i.e. when the reservoir is being exploited.

In particular, the method for inhibiting water permeation in an extraction well can be advantageously applied to the so-called "mature" extraction wells, that is to the wells that have now reached the limit of production capacity, which are characterized by the extraction of significant amounts of water in association with the hydrocarbon fluid.

The positioning of the inverse emulsion in a reservoir, for example, can be achieved with the equipment and according to the known arts of the oil extraction industry sector.

The positioning of the inverse emulsion in the reservoir can be carried out either through the extraction well of the hydrocarbon fluid or through the other wells generally present in an oil field, such as the wells for the injection of steam, water or other fluids (so-called injector wells) into the subsoil.

The inverse emulsions and the method according to the present invention can therefore be used in the context of the secondary and tertiary activities for the recovery of a hydrocarbon fluid, both in water blocking interventions (water shut-off treatment) and in the rock formation treatments (conformation treatment).

The amounts of inverse emulsion to be injected into the underground formation can vary widely according to the specific geological conformation of the reservoir.

The amount of inverse emulsion to be injected can be easily determined by the person skilled in the art on the basis of the geological characteristics of the reservoir and simple routine experimental tests, as is usually carried out in this sector.

The positioning of the water-in-oil emulsion containing the cationic hydrogels can advantageously be preceded by the injection of a first aliquot of an oily fluid, preferably the same oily fluid (or mixture of oily fluids) used for the preparation of the continuous phase of the aforementioned water-in-oil emulsion.

Equally advantageously, the positioning of the inverse emulsion in the reservoir can be followed by the positioning of a second aliquot of oily fluid to facilitate the penetration of the water-in-oil emulsion into the rock formation.

At the end of the positioning of the inverse emulsion and possibly of the first and second aliquot of the oily fluid, the extraction of the hydrocarbon fluid from the well can be started or resumed. Preferably, before proceeding with the extraction of the hydrocarbon fluid by injection of a displacement fluid, a period of time is waited (shut-in) sufficient to allow the inverse emulsion to release the hydrogel polymer particles once they come into contact with the reservoir water and obtain the desired effect of inhibiting water mobility.

If necessary, the extraction of the hydrocarbon fluid can be interrupted to carry out further injections of the treatment fluid, so as to obtain a further increase in the productivity of the extraction well.

The inverse emulsions according to the present invention can be prepared if necessary by diluting a concentrated water-in-oil emulsion with oil up to the desired concentration. The concentrated water-in-oil emulsion can have an oil/water ratio lower than the desired oil/water ratio for the final application.

The following examples of embodiment are provided for the sole purpose of illustrating the present invention and are not to be understood in a sense limiting the scope of protection defined by the appended claims.

EXAMPLE 1—PREPARATIONS OF INVERSE WATER-IN-OIL EMULSIONS CONTAINING CATIONIC MICROGELS

Water-in-oil emulsions containing cationic microgels were prepared by inverse suspension polymerization according to the following procedure.

An oily continuous phase was prepared by mixing under mechanical stirring LAMIX 30 as an oily fluid and a mixture of the commercial non-ionic surfactants SPAN80 and TWEEN80. The weight ratio between the two surfactants was selected so as to cause the polymerization reaction at the desired HLB value.

In the specific example of an HLB value equal to 6, the SPAN80 surfactant was used with a massive concentration, referring to the sum of the two surfactants, equal to 84%.

An aqueous discontinuous phase was prepared by dissolving in water, with the aid of an ultrasonic sonicator and keeping the temperature below 50° C., a cationic monomer ([2-(methacryloxy))ethyl] trimethylammonium chloride—MADQUAT), a cross-linking agent (N,N'-methylbis(acrylamide)—MBA) and optionally a (poly(ethylene glycol)methyl ether methacrylate comonomer of molecular weight 500 Da (PEGMEMA 500) or 2000 Da (PEGMEMA 2000)).

An aqueous solution of 2,2'-azobis(2-methylpropianimidine) dihydrochloride (AAPH) (thermally activatable radical polymerization initiator) was prepared separately, using a minimum amount of water sufficient to dissolve the compound.

The oily continuous phase and the aqueous discontinuous phase were mixed in a reactor with a volume equal to 2 liters, heated by means of a thermostatic oil bath. The mixing took place by means of a mechanical stirrer. The reactor was equipped with a water cooling jacket to remove the heat generated during the polymerization reaction. During polymerization, the reactor was kept under constant $N_2$ flow so as to remove the air inside it.

The weight ratio between the aqueous discontinuous phase and the total weight of the water-in-oil emulsion was selected equal to 16% for the PEG2 sample and 18% for the PEG4 and PEG11 samples.

The polymerization reaction was initiated by pouring the solution of the AAPH initiator drop by drop into the reaction mixture, previously heated to the polymerization temperature, equal to 70° C. or 80° C. The reaction duration was selected equal to 2 hours or 2.5 hours.

The following Table 1 shows the compositions of the prepared inverse emulsions of microgels.

TABLE 1

Composition of the emulsions of microgels

| Sample | MADQUAT (%)$^a$ | PEGMEMA 500 (%)$^a$ | PEGMEMA 2000 (%)$^a$ | MBA (%)$^a$ | AAPH (%)$^c$ | Surfactants (%)$^b$ | HLB |
|---|---|---|---|---|---|---|---|
| 1 (A4)$^d$ | 100 | — | — | 0.35 | 0.5 | 7.0 | 6 |
| 2 (PEG2)$^e$ | 95 | — | 5 | 0.35 | 0.5 | 5.0 | 4.3 |
| 3 (PEG4)$^e$ | 90 | — | 10 | 0.35 | 0.5 | 5.0 | 4.3 |
| 4 (PEG11)$^e$ | 92.5 | 7.5 | — | 0.35 | 0.5 | 5.0 | 4.3 |

$^a$percentage by weight with respect to the weight of MADQUAT + PEGMEMA comonomers;
$^b$percentage by weight referred to the total weight of the emulsion;
$^c$percentage by weight with respect to the total weight of MADQUAT + PEGMEMA comonomers + MBA;
$^d$polymerization temperature = 80° C.; polymerizationduration 2.5 hours;
$^e$polymerization temperature = 70° C.; polymerization duration 2.0 hours.

EXAMPLE 2—PREPARATION OF INVERSE WATER-IN-OIL EMULSIONS CONTAINING CATIONIC NANOGELS

Water-in-oil emulsions containing cationic nanogels were prepared by inverse miniemulsion polymerization according to the following procedure.

An oily continuous phase was prepared by mixing under mechanical stirring Eni LAMIX 30 as an oily fluid and a mixture of the commercial non-ionic surfactants SPAN80 and TWEEN80. The weight ratio between the two surfactants was selected so as to cause the polymerization reaction at the desired HLB value.

In the specific example of an HLB value equal to 10, the SPAN80 surfactant was used with a massive concentration, referring to the sum of the two surfactants, equal to 47%. An aqueous discontinuous phase was prepared by dissolving in water, with the aid of an ultrasonic sonicator and keeping the temperature below 50° C., a cationic monomer ([2-(methacryloxy))ethyl]trimethylammonium chloride MADQUAT), a cross-linking agent (N,N'-methylenbis(acrylamide)—MBA) and ammonium persulfate as a first initiator of the pair of redox initiators, ammonium persulfate (APS)/sodium metabisulfite (SMBS).

After conditioning the oily continuous phase in an ice bath (T equal to about 0-5° C.), the aqueous discontinuous phase was added to the oily continuous phase by keeping the mixture of the two phases under sonication. A SMBS aqueous solution was then added drop by drop to the mixture to initiate the polymerization reaction (polymerization duration 50 minutes).

The following Table 2 shows the compositions of the prepared inverse emulsions of nanogels.

TABLE 2

Composition of the emulsions of nanogels

| Sample | MADQUAT (%)$^a$ | MBA (%)$^b$ | APS (%)$^b$ | SMBS (%)$^b$ | Surfactants (%)$^b$ | HLB |
|---|---|---|---|---|---|---|
| 5 (MZ17) | 35 | 0.35 | 2.5 | 2.5 | 21 | 10 |

$^a$percentage by weight with respect to the weight of LAMIX 30 ®;
$^b$percentage by weight with respect to the tota weight of MADQUAT.

3. Characterization of Emulsions of Microgels and Nanogels
3.1 Swelling Test

The capacity of water absorption of the prepared microgels were determined by measuring the average particle diameter by means of a compound light microscope, before and after the swelling test. The swelling test was carried out by depositing a few drops of a water-in-oil emulsion in a vial previously filled with water with two different degrees of salinity or with Lamix 30®. The samples were allowed to rest for 24 hours to allow the thermodynamic equilibrium to be reached. The samples were then observed under a microscope to determine the final size of the microgel particles.

The average particle diameter and the polydispersion index (PDI) of the polymer of the nanogels of the MZ17 sample were determined by means of dynamic light scattering (DLS) measurements. The particle size distribution of the nanogels was monomodal. The results of the DLS measurements are shown in Table 5.

Table 3 shows the chemical compositions of the saline waters used in the test.

Table 4 shows the diameter values of the microgels determined in Lamix 30® and in the different waters tested.

TABLE 3

Composition of saline waters

|  | $Na^+$ (g/L) | $Ca^{2+}$ (g/L) | $Mg^{2+}$ (g/L) |
|---|---|---|---|
| Field A | 85 | 5.8 | 0.6 |
| Field B | 85 | 7.9 | 1.5 |

TABLE 4

Microgel diameter

|  | Lamix (μm) | Std. Dev. (μm) | Field B (μm) | Std. Dev. (μm) | Field A (μm) | Std. Dev. (μm) |
|---|---|---|---|---|---|---|
| A4 | 10.17 | 2.44 | 35.95 | 11.59 | 39.73 | 10.52 |
| PEG2 | 9.37 | 5.63 | 32.77 | 11.74 | 30.93 | 13.77 |
| PEG4 | 10.42 | 2.07 | 45.72 | 26.18 | 61.86 | 34.69 |
| PEG11 | 9.904 | 2.372 | 67.22 | 33.381 | 63.916 | 29.087 |

It has been observed that in the samples placed in contact with Lamix 30® the sizes of the microgels before and after the swelling test are substantially identical; this shows that the microgels do not swell in contact with oily fluids. On the other hand, in the samples in contact with water, the sizes of the microgels after the swelling test are greater than the sizes of the same microgels before the test.

TABLE 5

Nanogel diameter

|  | Diameter (nm) | Polydispersity (PDI) |
|---|---|---|
| 5 (MZ17) | 299.2 | 0.226 |

3.2 Compatibility Assessment of the Emulsions of Microgels with Production Fluids The following test was conducted to assess the behaviour of cationic microgels in contact with production fluids (formation water and hydrocarbon fluids).

A 10 ml aliquot of saline water was placed in a glass container. A 2 g aliquot of oil was added to it. The container was closed and conditioned in a stove at a temperature of 85° C. (to simulate the temperature of the well bottom). The sample was then taken from the stove and added with the emulsion containing the microgels.

The tested emulsions, having different concentrations of microgel particles, were dosed in the respective containers containing water and oil in amounts such as to obtain a concentration by weight of microgels equal to 26-28% referring to the weight of the mixture.

The following waters with different salinity originating from extraction fields of hydrocarbon oils were used in the test:

Field C (total salinity: 2.3 g/l)
Field D (total salinity: 84 g/l)
Standard Sea Water (total salinity: 35 g/l)

In tests a hydrocarbon oil having a density between 1.012 and 1.017 g/cm3 also originating from an extraction field of hydrocarbon oils was used as a heavy oil.

The glass containers containing the water-oil mixtures were placed in a stove and conditioned at 85° C. At the end of the conditioning, the emulsion containing the microgels in the amounts indicated above was added to each container. The containers were then overturned repeatedly to mix all the components thoroughly and put back in the stove at 85° C. for 24 hours.

At the end of the thermal conditioning, the degree of separation of the water and oil phases, the settlement of the microgels on the bottom of the container and the volume of the container occupied by the microgels following the swelling as a result of water absorption were assessed visually.

Samples 2, 3 and 4 all showed a good separation of the water and oil phases and the settlement of the particles of microgels with water absorption in all the tests, i.e. with all three of the aforementioned waters with different salinity. Sample 4, in particular, showed the best separation results of the water and oil phases (clearer aqueous phase and greater volume occupied by the swollen microgels).

The test therefore proved that the inverse emulsions containing microgels are compatible with the production fluids, in particular their contact with these fluids does not lead to the emulsion of oil with water that may be present, which in a real situation could worsen the oil extraction effectiveness, increasing the amount of co-produced water.

The tests also show the effectiveness of the emulsions prepared according to the present invention in a very wide range of water salinity.

3.3 Assessment of the Emulsions of Microgels with Production Fluids in the Presence of Calcium Carbonate The following test was performed to assess the effectiveness of the interaction of the inverse emulsions according to the present invention with a carbonatic rock.

10 g of solid calcium carbonate was weighed in one vial. 3 g of saline water or 4.5 g (Standard Sea Water having total salinity equal to 35 g/l) were then added to the vial. The amount equal to 3 g was sufficient to completely cover the present calcium carbonate (Series 1). The amount equal to 4.5 g produced an excess water condition (Series 2). 2 ml of an oil phase (Field D) were slowly deposited on the water phase. The vials were then placed in a stove and conditioned at 85° C. At the end of the conditioning, the emulsion containing the microgels was slowly added to each vial, in an amount equal to 2 ml, taking care not to create turbulence.

The vials were then put back in the stove at 85° C. for 24 hours.

At the end, it was assessed visually whether the particles of microgels were able to cross the oil phase without causing any emulsion thereof and where these particles were positioned. The vials, after a period of 24 hours, were overturned so as to assess the degree of adhesion to the calcium carbonate.

For comparison, the test was repeated with an inverse emulsion of microgels containing copolymers of methacrylic acid (partially neutralized with NaOH) and poly (ethylene glycol)methyl ether methacrylate (HEMA-PEG, MW=2000 Da, 42 polyoxyethylene units) prepared as described in Example 2 of WO 2016/166672.

In the Series 1 samples added with the emulsions containing the cationic microgels No. 2, 3 and 4, the total penetration of the particles of microgels between the calcium carbonate grains was observed. This penetration was not observed substantially in the comparative sample.

Probably, the observed penetration is attributable to the electrostatic attraction between the positive charges of the cationic microgels and the negative charges of the calcium carbonate, as well as the smaller sizes of the particles of the cationic microgels (about 10 micrometers) with respect to the comparative microgel particles (about 20 micrometers).

Furthermore, after overturning the vials, it was observed that samples No. 2, 3 and 4 help to compact the carbonate grains together, such that the solid phase remains firm on the bottom of the vial even when it is overturned. On the contrary, in the comparative sample, when the vial was overturned, the grain break-up of the calcium carbonate grains was observed and their sliding downwards.

The same behaviour of the cationic microgels according to the invention and of the comparative one was observed in the Series 2 samples containing excess water.

The test has proved a greater capability of the particles of the microgels of the emulsions according to the present invention of interacting with the carbonatic rocks with respect to the emulsions of microgels of the prior art.

4. Characterization of the Emulsions of Nanogels 4.1 Test 1—Flushing of Cores Saturated with Oil and Saline Water The injectability of sample 5 containing particles of nanogels inside a sandy medium (Berea Sandstone) and its ability to modify water permeability in a formation was assessed by means of flux measurements in porous medium. For this purpose, a cylindrical core with a length equal to 5.09 cm and a diameter equal to 2.47 cm, having a porosity of 16.5% was used. The core was placed in a core holder under confining pressure (40 bar) to avoid fluid leaks.

The core was initially filled with synthetic sea water (salinity: 33 g/L) and brought to the temperature of 40° C. in the stove. The core was then flushed with Lamix 30® until it reached the conditions in which water is no longer produced (Core under residual water saturation). At this point sample 5 was injected for about 24 times the pore volume. The core was then allowed to rest at 40° C. for 24 hours (shut-in) to allow for the action of the nanogels. At the end of the shut-in period, the core was again flushed with synthetic sea water, to verify the possible effect of reduction of permeability to water generated by the cationic nanogels.

Sample 5 was easily injectable and no pressure increases were observed during its injection.

The final flushing with saline water showed a reduction in the permeability of the core to water with respect to flushing with water before the treatment with the inverse emulsion according to the invention. The value of the initial water permeability was in fact 36 mD and drops to 1.4 mD at the end of the test, due to the desired behaviour of the cationic nanogels.

The invention claimed is:

1. A method for inhibiting water permeation in an extraction well of a hydrocarbon fluid from an underground reservoir, the method comprising:
   positioning a water-in-oil emulsion in contact with the underground reservoir, the water-in-oil emulsion comprising (i) an oily continuous phase and (ii) an aqueous discontinuous phase comprising a plurality of hydrogel particles comprising a cationic polymer; and
   inhibiting water mobility by waiting a sufficient period of shut-in time to allow the water-in-oil emulsion to release the hydrogel polymer particles once they come into contact with reservoir water,
   wherein the cationic polymer comprises, in polymerized form, (1) a first monomer comprising a cationic group and (2) a second monomer comprising an ethylenic unsaturation and a polyoxyethylene chain, and
   wherein the cationic polymer comprises no anionic unit.

2. The method of claim 1, wherein the cationic group of the first monomer (1) is a $-N^+-R^1R^2R^3$ group,
   wherein $R^1$, $R^2$, and $R^3$ are independently H or a $C_1$-$C_4$ alkyl group.

3. The method of claim 1, wherein the first monomer (1) comprises a water-soluble salt of [2-(methacryloyloxy)ethyl] trimethylammonium and/or a water-soluble salt of 2-(acryloyloxy) ethyl trimethyl ammonium.

4. The method of claim 3, wherein the second monomer (2) comprises poly(ethylene glycol)methyl ether acrylate, poly(ethylene glycol)methyl ether methacrylate, or a mixture thereof.

5. The method of claim 4, wherein a weight ratio of the poly(ethylene glycol)methyl ether acrylate, poly(ethylene glycol)methyl ether methacrylate, or mixture thereof to the water-soluble salt of [2-(methacryloyloxy)ethyl] trimethylammonium and/or water-soluble salt of 2-(acryloyloxy) ethyl trimethyl ammonium, in polymerized form, is in a range of from 5 to 50%.

6. The method of claim 4, wherein the second monomer (2) comprises the poly(ethylene glycol)methyl ether acrylate or the poly(ethylene glycol)methyl ether methacrylate, and
   wherein the poly(ethylene glycol)methyl ether acrylate or poly(ethylene glycol)methyl ether methacrylate has a molecular weight in a range of from 200 to 10000 Da.

7. The method of claim 1, wherein the cationic polymer is a cross-linked polymer.

8. The method of claim 1, wherein the oily continuous phase is present in a ratio with respect to the aqueous discontinuous phase in a range of from 50:50 to 95:5 by weight.

9. The method of claim 1, wherein the hydrogel particles have an average diameter in a range of from 1 to 1000 μm.

10. The method of claim 1, wherein the hydrogel particles have an average diameter in a range of from 10 to 500 nm.

11. The method of claim 1, further comprising:
   (a) positioning a first aliquot of an oily fluid in contact with the underground reservoir;
   (b) the positioning of the water-in-oil emulsion;
   (c) positioning a second aliquot of the oily fluid; and
   (d) injecting a displacement fluid for producing the hydrocarbon fluid.

12. The method of claim 1, wherein the second monomer (2) comprises poly(ethylene glycol)methyl ether acrylate, and wherein the poly(ethylene glycol)methyl ether acrylate has a molecular weight in a range of from 200 to 10000 Da.

13. The method of claim 1, wherein the second monomer (2) comprises poly(ethylene glycol)methyl ether methacrylate, and wherein the poly(ethylene glycol)methyl ether methacrylate has a molecular weight in a range of from 200 to 10000 Da.

14. The method of claim 1, wherein the second monomer (2) comprises poly(ethylene glycol)methyl ether acrylate, poly(ethylene glycol)methyl ether methacrylate, or a mixture thereof.

* * * * *